(12) United States Patent
Farmer (10) Patent No.: US 10,794,992 B2
(45) Date of Patent: Oct. 6, 2020

(54) APPARATUS AND METHOD FOR DETECTING AND CORRECTING FOR BLOCKAGE OF AN AUTOMOTIVE RADAR SENSOR

(71) Applicant: Veoneer US, Inc., Southfield, MI (US)

(72) Inventor: William Farmer, Southfield, MI (US)

(73) Assignee: VEONEER US, INC., Southfield, MI (US)

(*) Notice: Subject to any disclaimer, the term of this patent is extended or adjusted under 35 U.S.C. 154(b) by 322 days.

(21) Appl. No.: 15/937,026

(22) Filed: Mar. 27, 2018

(65) Prior Publication Data

US 2019/0025404 A1    Jan. 24, 2019

Related U.S. Application Data

(60) Provisional application No. 62/533,796, filed on Jul. 18, 2017.

(51) Int. Cl.
| | |
|---|---|
| *G01S 7/40* | (2006.01) |
| *G01S 13/58* | (2006.01) |
| *G01S 13/60* | (2006.01) |
| *G01S 13/931* | (2020.01) |
| *G01S 7/35* | (2006.01) |
| *G01S 13/34* | (2006.01) |

(52) U.S. Cl.
CPC .............. *G01S 7/40* (2013.01); *G01S 7/4026* (2013.01); *G01S 13/582* (2013.01); *G01S 13/60* (2013.01);
(Continued)

(58) Field of Classification Search
CPC ......... G01S 2013/93271; G01S 13/582; G01S 13/584; G01S 2013/93272;
(Continued)

(56) References Cited

U.S. PATENT DOCUMENTS

| | | |
|---|---|---|
| 5,959,570 A | 9/1999 | Russell |
| 6,124,823 A | 9/2000 | Tokoro |
| (Continued) | | |

FOREIGN PATENT DOCUMENTS

| | | |
|---|---|---|
| DE | 19647660 | 5/1998 |
| DE | 19929794 | 1/2000 |
| (Continued) | | |

OTHER PUBLICATIONS

International Search Report and Written Opinion in corresponding International Application No. PCT/US2018/041802, dated Oct. 15, 2018; 15 pages.

*Primary Examiner* — Timothy X Pham
(74) *Attorney, Agent, or Firm* — Burns & Levinson, LLP; Steven M. Mills (57) ABSTRACT

A radar detection system and method include a radar detector for transmitting radar signals over a plurality of sweeps, detecting reflected returning radar signals for the sweeps, and converting the reflected returning radar signals into digital data signals, which are processed to by a time-averaging approach by which data for each of a plurality of range-plus-velocity (RV) bins is analyzed over multiple sweeps to detect a first clutter object at particular RV value and an RV-averaging approach by which data for a plurality of RV values within each sweep are combined to form RV averages for each sweep and the RV averages for a plurality of sweeps are analyzed over multiple sweeps to detect a second clutter object. The processor indicates that the radar detector is not blocked if the time-averaging approach or the RV averaging approach results in at least one of the clutter objects being detected.

14 Claims, 9 Drawing Sheets

(52) U.S. Cl.
CPC ........... *G01S 13/931* (2013.01); *G01S 13/343* (2013.01); *G01S 2007/356* (2013.01); *G01S 2007/358* (2013.01); *G01S 2007/4039* (2013.01); *G01S 2013/9322* (2020.01); *G01S 2013/93271* (2020.01); *G01S 2013/93272* (2020.01); *G01S 2013/93275* (2020.01)

(58) Field of Classification Search
CPC ... G01S 2013/93275; G01S 2007/4975; G01S 7/4802; G01S 7/487
See application file for complete search history.

(56) References Cited

U.S. PATENT DOCUMENTS

| | | |
|---|---|---|
| 6,469,659 B1 | 10/2002 | Lajiness et al. |
| 6,611,227 B1 | 8/2003 | Nebiyeloul-Kifle et al. |
| 7,218,208 B2 | 5/2007 | Kikuchi |
| 7,973,701 B2 | 7/2011 | Lohmeier et al. |
| 8,441,394 B2 | 5/2013 | Alland |
| 9,453,910 B2 | 9/2016 | Elwart et al. |
| 2002/0163463 A1 | 11/2002 | Lajiness et al. |
| 2005/0192769 A1 | 9/2005 | Reyher |
| 2009/0243912 A1 | 10/2009 | Lohmeier et al. |
| 2010/0073218 A1 | 3/2010 | Stockmann |
| 2013/0015999 A1 | 1/2013 | Alland |
| 2016/0320471 A1 | 11/2016 | Preussner |
| 2017/0059695 A1 | 3/2017 | Fetterman et al. |
| 2017/0269196 A1* | 9/2017 | Millar .................. G01S 7/4026 |

FOREIGN PATENT DOCUMENTS

| | | |
|---|---|---|
| DE | 102005013146 | 9/2006 |
| DE | 102009001265 | 9/2010 |
| DE | 102009032124 A1 | 1/2011 |
| EP | 2546676 A1 | 1/2013 |

\* cited by examiner

APPARATUS AND METHOD FOR DETECTING AND CORRECTING FOR BLOCKAGE OF AN AUTOMOTIVE RADAR SENSOR

RELATED APPLICATION

This application is based on and claims the benefit of U.S. Provisional Patent Application No. 62/533,796, filed in the U.S. Patent and Trademark Office on Jul. 18, 2017, the contents of which are incorporated herein in their entirety.

BACKGROUND

1. Technical Field

The present disclosure is related to automotive radar systems and, in particular, to an apparatus and method for detecting and correcting for blockage of an automotive radar sensor.

2. Discussion of Related Art

In automotive radar systems, it is desirable to detect when the radar sensor is blocked by debris, such as dirt, snow, ice, etc. Sensor blockage or radar blockage attenuates the transmitted and received signal such that objects in the field of view are no longer detectable. It is also important to alert the driver when the sensor is blocked so that the driver does not rely on the radar system while a sensor is blocked, and so that the driver can intervene and clear the debris from the sensor to restore performance of the system.

Declaring a sensor blockage based on the absence of radar signal processing detections is a relatively straightforward means of determining sensor blockage with minimal additional processing time or resources. One drawback of this approach is that it is difficult to distinguish the blocked case from the case in which there are relatively few or no objects large enough to create detections in the field of view of a sensor that is not blocked and is functioning properly. This situation can occur, for example, when the automobile in which the system is operating is passing through a desert or along a bridge or causeway surrounded by water.

SUMMARY

According to one aspect, a radar system in a movable host system is provided. The radar system includes a radar detector for transmitting radar signals into a region over a plurality of sweeps, detecting reflected returning radar signals for each of the plurality of sweeps, and converting the reflected returning radar signals into digital data signals. A processor receives the digital data signals and processes the digital data signals to detect environmental clutter objects in the region. The processor carries out at least a time-averaging approach by which data for each of a plurality of range-plus-velocity (RV) bins is analyzed over multiple sweeps to detect a first clutter object at particular RV value and an RV-averaging approach independent of the time-averaging approach by which data for a plurality of RV values within each sweep are combined to form RV averages for each sweep and the RV averages for a plurality of sweeps are analyzed over multiple sweeps to detect a second clutter object. The processor generates a signal indicating that the radar detector is not blocked if either of the time-averaging approach or the RV averaging approach results in at least one of the first and second clutter objects being detected.

In some exemplary embodiments, the processor further processes the digital data signals to identify environmental clutter objects in the region by an immediate detection approach by which digital data signals are compared to a clutter threshold, the processor identifying a clutter object if the digital data signals exceed the clutter threshold, the processor generating the signal indicating that the radar detector is not blocked if any of the time-averaging approach, the RV averaging approach, or the immediate-detection approach results in a clutter object being detected.

In some exemplary embodiments, the first and second clutter objects are the same object.

In some exemplary embodiments, if a strength of the reflected returning radar signals rises and falls with time, then a clutter object is detected.

In some exemplary embodiments, if a strength of the reflected returning radar signals rises and falls with RV, then a clutter object is detected.

In some exemplary embodiments, under the time averaging approach, RV variations of a set of temporal averaged Doppler measurements from a number of sweeps are compared to an RV variation threshold, and, if the RV variation threshold is exceeded, then a clutter object is detected.

In some exemplary embodiments, under the RV averaging approach, the variations of a set of RV averaged sweeps are compared to a temporal variation threshold and, if the temporal variation threshold is exceeded, then a clutter object is detected.

According to another aspect, a radar detection method in a movable host radar detection system is provided. The radar detection method includes transmitting radar signals into a region over a plurality of sweeps; detecting reflected returning radar signals for each of the plurality of sweeps; converting the reflected returning radar signals into digital data signals; and processing the digital data signals to detect environmental clutter objects in the region. The processing includes: (i) performing a time-averaging process by which data for each of a plurality of range-plus-velocity (RV) bins is analyzed over multiple sweeps to detect a first clutter object at particular RV value, (ii) performing an RV-averaging process independent of the time-averaging process by which data for a plurality of RV values within each sweep are combined to form RV averages for each sweep and the RV averages for a plurality of sweeps are analyzed over multiple sweeps to detect a second clutter object, and (iii) generating a signal indicating that the radar detector is not blocked if either of the time averaging process or the RV averaging process results in at least one of the first and second clutter objects being detected.

In some exemplary embodiments, processing the digital data signals further comprises performing an immediate detection process to identify environmental clutter objects in the region, the immediate detection process comprising: comparing the digital data signals to a clutter threshold, identifying a clutter object if the digital data signals exceed the clutter threshold, and generating the signal indicating that the radar detector is not blocked if any of the time-averaging process, the RV averaging approach, or the immediate-detection process results in a clutter object being detected.

In some exemplary embodiments, the first and second clutter objects are the same object.

In some exemplary embodiments, if a strength of the reflected returning radar signals rises and falls with time, then a clutter object is detected.

In some exemplary embodiments, if a strength of the reflected returning radar signals rises and falls with RV, then a clutter object is detected.

In some exemplary embodiments, under the time averaging process, RV variations of a set of temporal averaged Doppler measurements from a number of sweeps are compared to an RV variation threshold, and, if the RV variation threshold is exceeded, then a clutter object is detected.

In some exemplary embodiments, under the RV averaging process, the variations of a set of RV averaged sweeps are compared to a temporal variation threshold and, if the temporal variation threshold is exceeded, then a clutter object is detected.

BRIEF DESCRIPTION OF THE DRAWINGS

The present disclosure is further described in the detailed description which follows, in reference to the noted plurality of drawings by way of non-limiting examples of embodiments of the present disclosure, in which like reference numerals represent similar parts throughout the several views of the drawings.

DETAILED DESCRIPTION

Automotive radar is designed for active safety, and to provide a continuous level of safety, the radar must be able to detect if it is functioning according to specifications. If the radar is blocked by mud or snow or other obscurants, then the radar performance may be significantly degraded, and the user should be alerted. In some configurations, it would be desirable to include a secondary radar sensor dedicated to monitoring the physical state of the primary radar. However, due to considerations of cost and physical space, this approach is considered impractical. Therefore, according to the present disclosure, the radar system itself is configured to detect whether it is blocked and to report blockage to the user/operator. According to the present disclosure, an approach to detecting blockage, concluding whether the radar is blocked or unblocked, and reporting radar sensor blockage is described in detail. It should be noted that the exemplary radar system claimed and described in detail herein has a central frequency of approximately 24 GHz with an elevation beam width of approximately 20° FWHM (full-width half-maximum). In some exemplary embodiments, the radar sensor is typically mounted about 0.5 m above the road.

Figure 1:
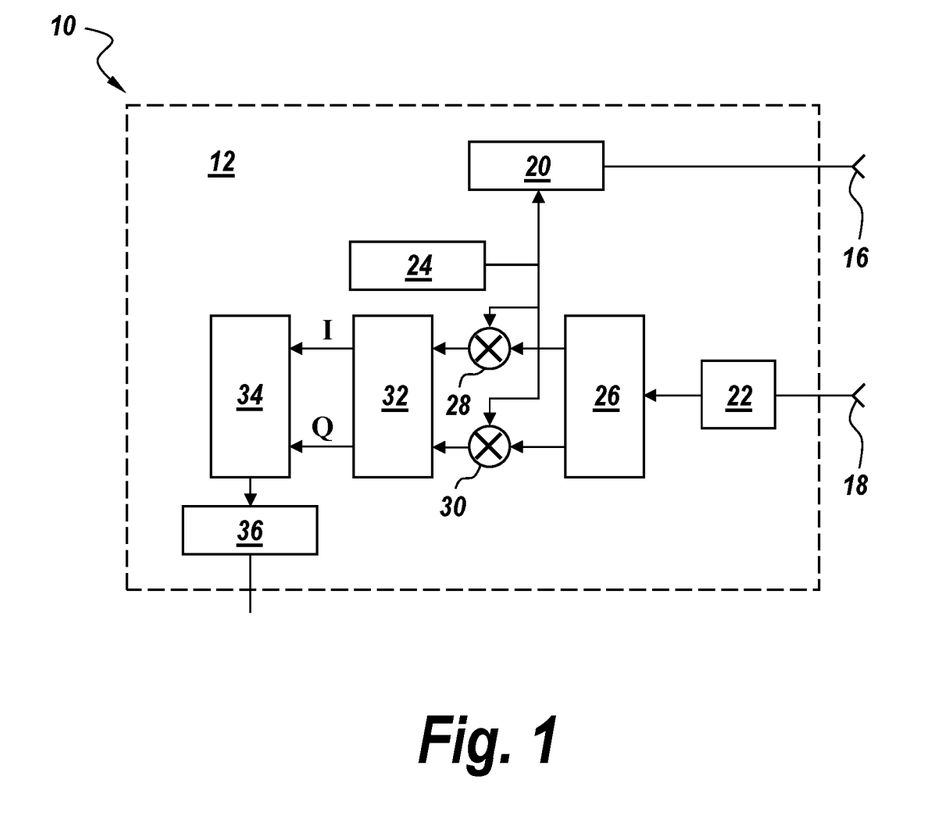
FIG. 1 includes a schematic block diagram of an automotive radar sensor module for processing automotive radar signals, according to some exemplary embodiments.

FIG. 1 includes a schematic block diagram of an automotive radar system 10 for processing automobile radar signals, in accordance with some exemplary embodiments. Referring to FIG. 1, system 10 includes a radar sensor module 12, which processes radar transmit and receive signals which are compatible with the radar detection and monitoring system in the host automobile. Radar module 12 generates and transmits radar signals into the region adjacent to the host vehicle that is being monitored by the radar system. Generation and transmission of signals is accomplished by RF signal generator 24, radar transmit circuitry 20 and transmit antenna 16. Radar transmit circuitry 20 generally includes any circuitry required to generate the signals transmitted via transmit antenna 16, such as pulse shaping circuitry, transmit trigger circuitry, RF switch circuitry, or any other appropriate transmit circuitry used by the radar system.

Radar module 12 also receives returning radar signals at radar receive circuitry 22 via receive antenna 18. Radar receive circuitry 22 generally includes any circuitry required to process the signals received via receive antenna 18, such as pulse shaping circuitry, receive trigger circuitry, RF switch circuitry, or any other appropriate receive circuitry used by the radar system. In some exemplary embodiments, the received signals processed by radar receive circuitry 22 are forwarded to phase shifter circuitry 26, which generates two signals having a predetermined phase difference. These two signals, referred to as an inphase (I) signal and a quadrature (Q) signal, are mixed with an RF signal from RF signal generator 24 by mixers 28 and 30, respectively. The resulting difference signals are further filtered as required by filtering circuitry 32 to generate baseband I and Q signals, labeled "I" and "Q" in FIG. 1. The baseband I and Q signals are digitized by analog-to-digital converter circuitry (ADC) 34.

In automobile radar systems, these digitized I and Q baseband signals are processed by a processor 36, which can include such circuitry as a digital signal processor (DSP), associated memory, associated I/O circuitry, communication bus circuitry, and any other circuitry required for carrying out any processing functions of system 10 and/or radar sensor 12. In some exemplary embodiments, the radar module 12 transmits and receives radar sweeps, i.e., frequency-modulated (FM) chirps, at a rate of approximately 12 Hz. In some exemplary embodiments, processor 36 can perform processing such as a fast Fourier Transform (FFT) to generate Doppler range-plus-velocity (RV) bins for each sweep, which include range, bearing and velocity information for radar detection of clutter. It will be understood that other sweep rates can be used. As used herein, the term "clutter" refers to any target or physical object that may return a radar signal resulting in a radar detection. These Doppler RV bins of radar clutter data are processed according to the detailed description herein to identify when the sensor is blocked.

According to the present disclosure, radar system 10 determines whether system 10 is detecting other automobiles and stationary objects in the region being monitored. If the radar is detecting clutter objects, e.g., other vehicles, poles, guardrails, road surface, etc., then the blockage state may be set to unblocked or clear. However, the converse is not necessarily true. That is, if the radar is not detecting clutter, it cannot necessarily be concluded that the radar is blocked. Instead, it is considered that the automobile could be in the desert scenario where there is little clutter. It should be noted that, according to the present disclosure, environments having little radar clutter may include a desert, or other regions such as a large parking lot with no features, a large snow-covered area, a bridge or causeway adjacent to a body of water, or a grassy landscape.

According to the present disclosure, it is recognized that, in different environments, detections of environmental clutter, such as stationary ground clutter, e.g., poles, guardrails, road surface, etc., will have different signatures. Accordingly, observations of clutter detections are analyzed to identify and distinguish the environments in which the system is operating, such that a reliable determination of sensor blockage can be generated. In some exemplary embodiments, clutter observations are analyzed using multiple approaches, and the results are fused to generate a conclusion as to whether the sensor is clear or blocked.

Specifically, according to the present disclosure, detection data in the Doppler RV bins can be subjected to multiple, e.g., three, analyses. These analyses can include an immediate detection analysis, a temporal averaging analysis and an RV averaging analysis. The immediate detection analysis is analogous to normal radar detection processing, in which clutter detections are characterized by relatively strong radar returns. Such clutter includes a passing automobile or a ground-stationary object, such as a light pole. The temporal averaging analysis focuses on clutter at constant RV values, such as roadside barriers, e.g., guardrails, which have weak radar returns. The RV averaging analysis focuses on temporally changing clutter at indistinct ranges, such as could occur in clutter-sparse environments, such as a desert, landscapes with rolling hills, bodies of water, etc.

Figure 2:
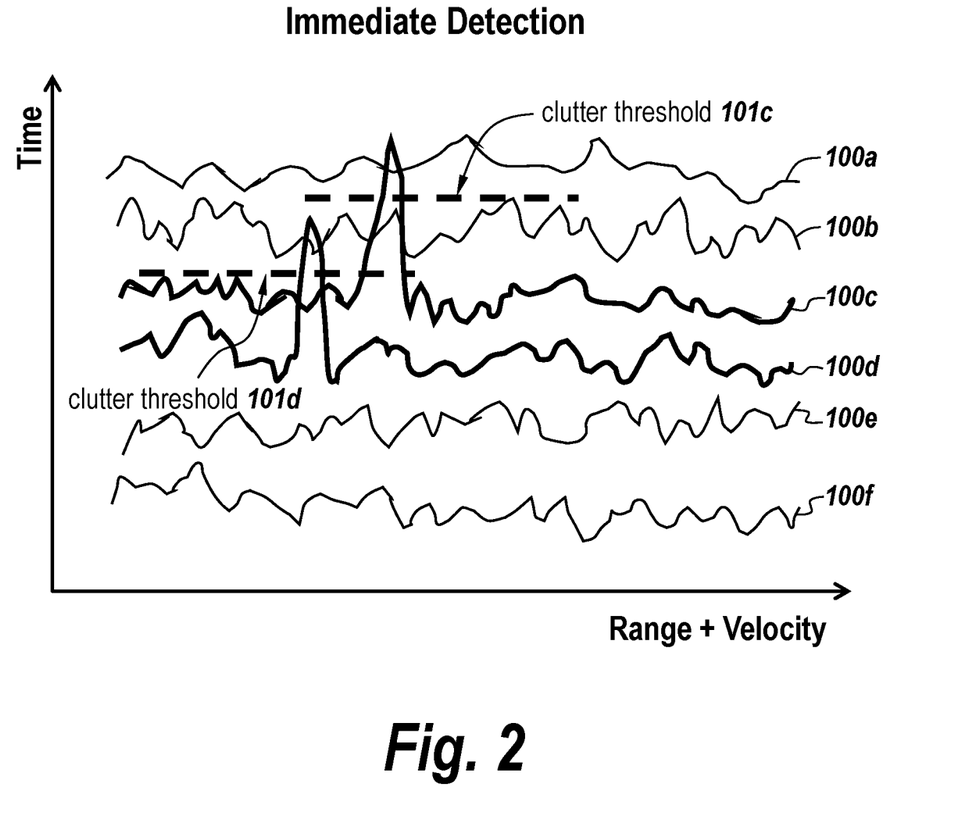
FIGS. 2, 3 and 4A-4B include waveform diagrams illustrating immediate detection analysis, temporal averaging analysis and range-plus-velocity (RV) averaging analysis for detection of radar sensor blockage, according to some exemplary embodiments.
Figure 3:
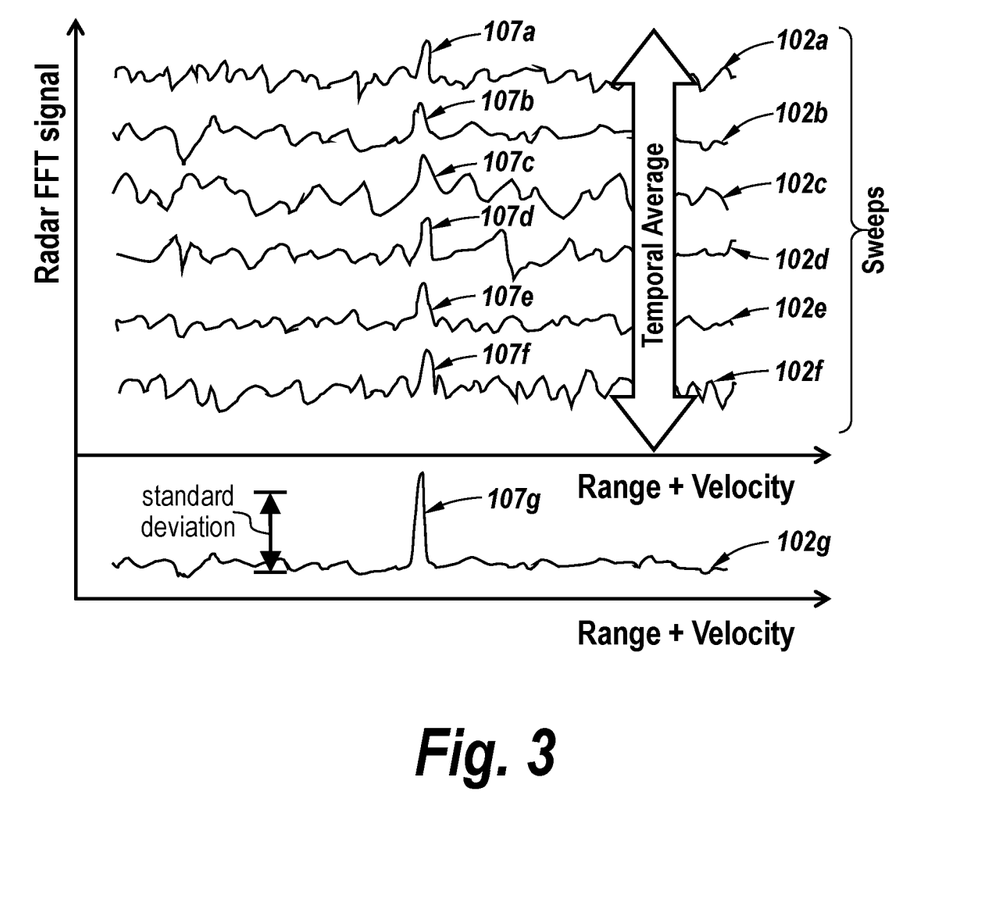
Figures 4A, 4B:
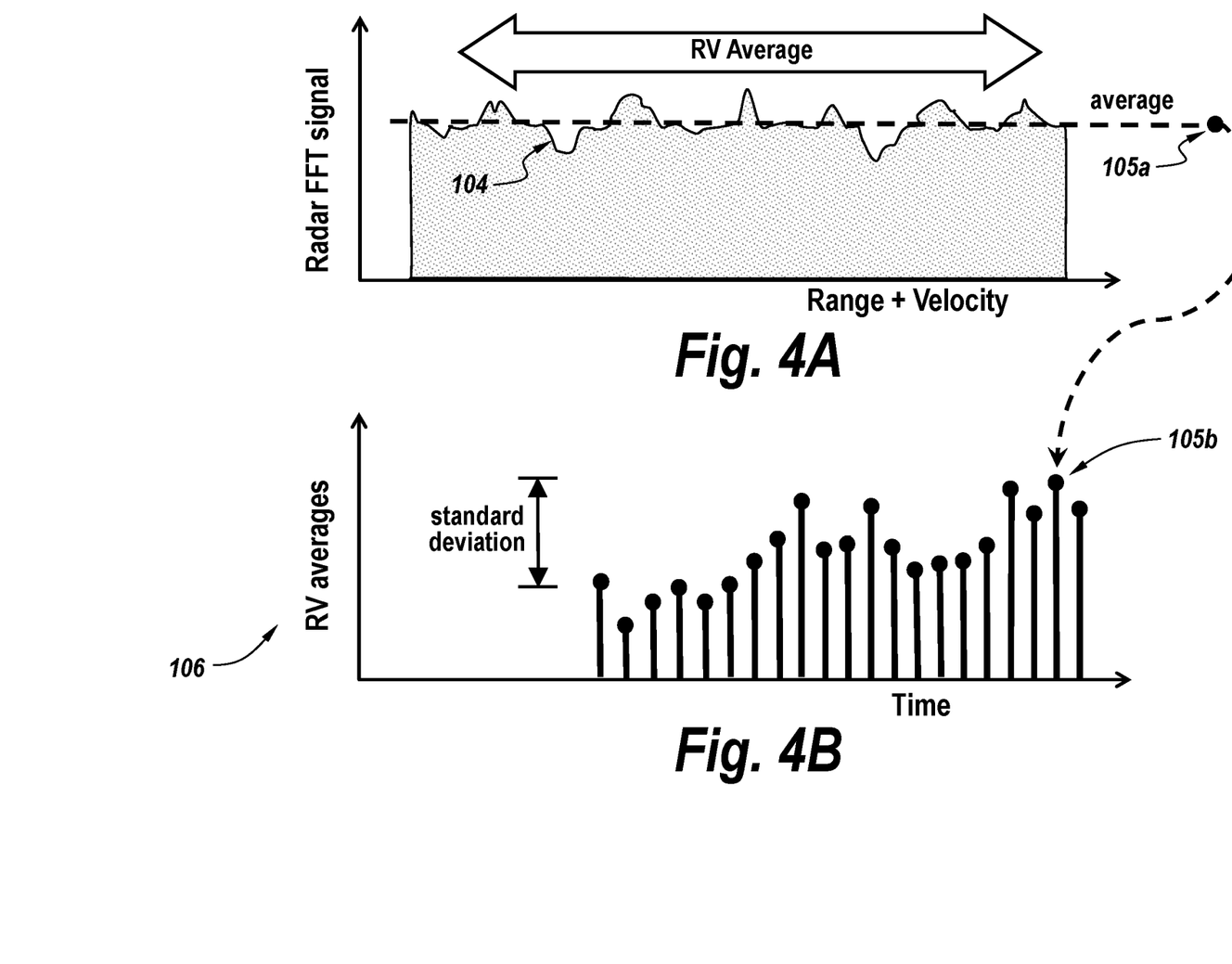

FIGS. 2, 3 and 4 are waveform diagrams illustrating the immediate detection analysis, temporal averaging analysis and RV averaging analysis, respectively, for detection of radar sensor blockage, according to some exemplary embodiments. In each diagram, waveforms are plotted representing radar returns from successive sweeps. Each plotted waveform represents the FFT of an FM chirp radar sweep. Each plotted waveform shows radar reflective clutter as peaks positioned on the horizontal RV axis, representing the sum of the clutter object range and the clutter object velocity relative to the radar sensor, which is a known property of FM chirp radar.

Referring to FIG. 2, which illustrates immediate detection analysis of the disclosure, six radar returns 100a through 100f are illustrated. Each of the returns is compared to a clutter threshold. Where the return waveform exceeds the clutter threshold, the return is concluded to identify a clutter object. For example, returns 100c and 100d are associated with a strong reflecting clutter object, which produces tall peaks in the returns, which peaks are shown to exceed their respective immediate clutter thresholds 101c and 101d. These strong returns result in a positive clutter indication being generated by the immediate detection analysis. Because of the positive clutter indication, it can be concluded that the sensor is not blocked.

Referring to FIG. 3, which illustrates temporal averaging analysis of the disclosure, return waveforms 102a through 102f include no peaks tall enough to exceed their respective immediate clutter thresholds. As a result, the immediate detection analysis does not yield a clutter detection. In waveforms 102a through 102f, relatively small peaks 107a through 107f, respectively, indicate a weak stationary clutter, which is largely obscured by noise. An example of such a stationary clutter object could be a barrier, e.g., a concrete wall along the road, which is a constant distance from the moving host vehicle. Since the distance to the barrier is not changing, it has zero velocity relative to the radar sensor, and the radar signal from the barrier shows up at one RV location determined by the distance, i.e., range, to the barrier. According to the present disclosure, the temporal averaging analysis is used for such a situation to combine many radar returns, including returns 102a through 102f, from multiple respective sweeps, to produce a clear signal from the weak clutter. This combined signal is illustrated schematically as waveform 102g of FIG. 3. As a result of the combination of many returns, the combined return 102g includes a combined peak 107g, which is more pronounced than the peaks of the individual waveforms 102a through 102f. As a result, the temporal averaging or combination results in better discrimination of this clutter against background noise compared to what is obtained with the immediate detection analysis by itself. A high variation of the averaged data across RV values, as quantified by the standard deviation, provides a positive clutter indication, and it can be concluded that the sensor is not blocked.

Referring to FIG. 4A, which illustrates temporal averaging analysis of the disclosure, return waveform 104 changes strength as a function of time. In this scenario, there may be no distinct clutter objects present. An example of this situation is a landscape of gently changing radar reflectivity without distinct clutter objects at specific ranges. According to the present disclosure, an RV interval of data for each radar sweep is averaged. The result of this averaging is a value 105a illustrated in FIG. 4A. Referring to FIG. 4B, this same value 105b is stored with a sequence of RV averages from radar sweeps at other times. As illustrated in FIG. 4B, a high temporal variation of the averages from different sweeps, as quantified by their standard deviation, provides a positive clutter indication, and it can be concluded that the sensor is not blocked.

According to the present disclosure, the results of the immediate detection analysis, temporal averaging analysis and RV averaging analysis are fused to generate an overall result regarding possible blockage of the radar sensor. For example, the results can be logically "OR'ed" such that if any of the three analyses generates a clutter detection, then it can be concluded that the sensor is not blocked. Conversely, if none of the three analyses generates a clutter detection, then it can be concluded that the sensor is blocked.

Figure 5:
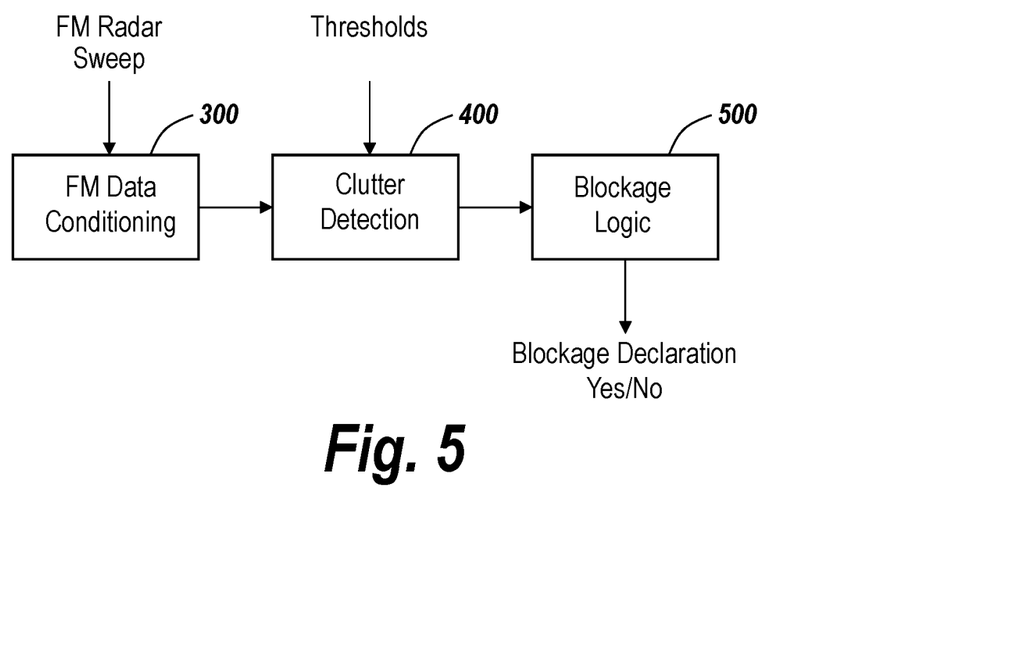
FIG. 5 includes a top-level logical flow diagram illustrating steps in a method of detecting radar sensor blockage, according to some exemplary embodiments.

FIG. 5 includes a top-level logical flow diagram illustrating steps in a method of detecting radar sensor blockage, according to some exemplary embodiments. Referring to FIG. 5, FM radar sweep data collection and conditioning, including FFT processing is performed in step 300. The data for the sweeps, as illustrated and described above in connection with FIGS. 3 through 5, is analyzed to generate clutter detections is step 400. This clutter detection processing receives the individual predetermined detection thresholds and compares the processed sweep data to the thresholds as described above. The results of the three analyses are logically OR'ed, such that a positive detection by any of the analyses results in a conclusion of a clutter detection. This OR'ed clutter result is input to blockage logic 500 to determine whether a blockage declaration should be issued.

Figure 6:
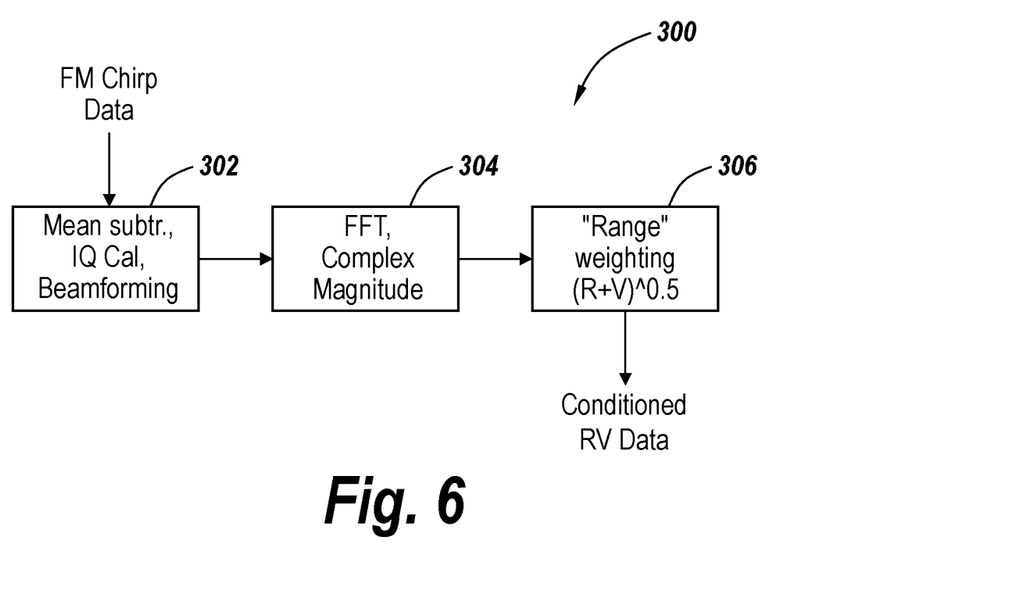
FIG. 6 includes a logical flow diagram of steps in FM data collection and conditioning 300 illustrated in FIG. 5, according to some exemplary embodiments.

FIG. 6 includes a logical flow diagram of steps in FM data collection and conditioning 300 illustrated in FIG. 5, according to some exemplary embodiments. Referring to FIG. 6, the FM chirp data is received and processed at step 302, the processing including mean subtraction, I-Q calibration correction, beamforming and other data processing and conditioning. Next, in step 304, further processing of the FM data, including complex FFT, is performed. Those of ordinary skill in the art will recognize the operations in steps 302, 304 and 306 as traditional radar processing operations whose purpose is to provide Doppler radar detections. The operations in step 302 condition the radar data in preparation for the FFT operation in step 304. The operations in step 304 provide an array of bins containing complex-valued Doppler signals and convert them to real-valued Doppler detection magnitudes. Those of ordinary skill in the art will recognize the array of bins is indexed by the range-plus-velocity (RV) of detected clutter in the radar data, where velocities are measured radially with respect to the radar transmitter/receiver. In step 306, weighting is performed on the data in each RV bin. In some exemplary embodiments, data from certain predetermined RV bins is emphasized by weighting, and data from other predetermined RV bins is deemphasized by weighting. For example, in some exemplary embodiments, data from low-valued RV bins are deemphasized by weighting, and data from high-valued RV bins are emphasized by weighting. The conditioned RV data, including weighted Doppler radar detections in an array of RV bins, is forwarded to clutter detection 400.

Figure 7:
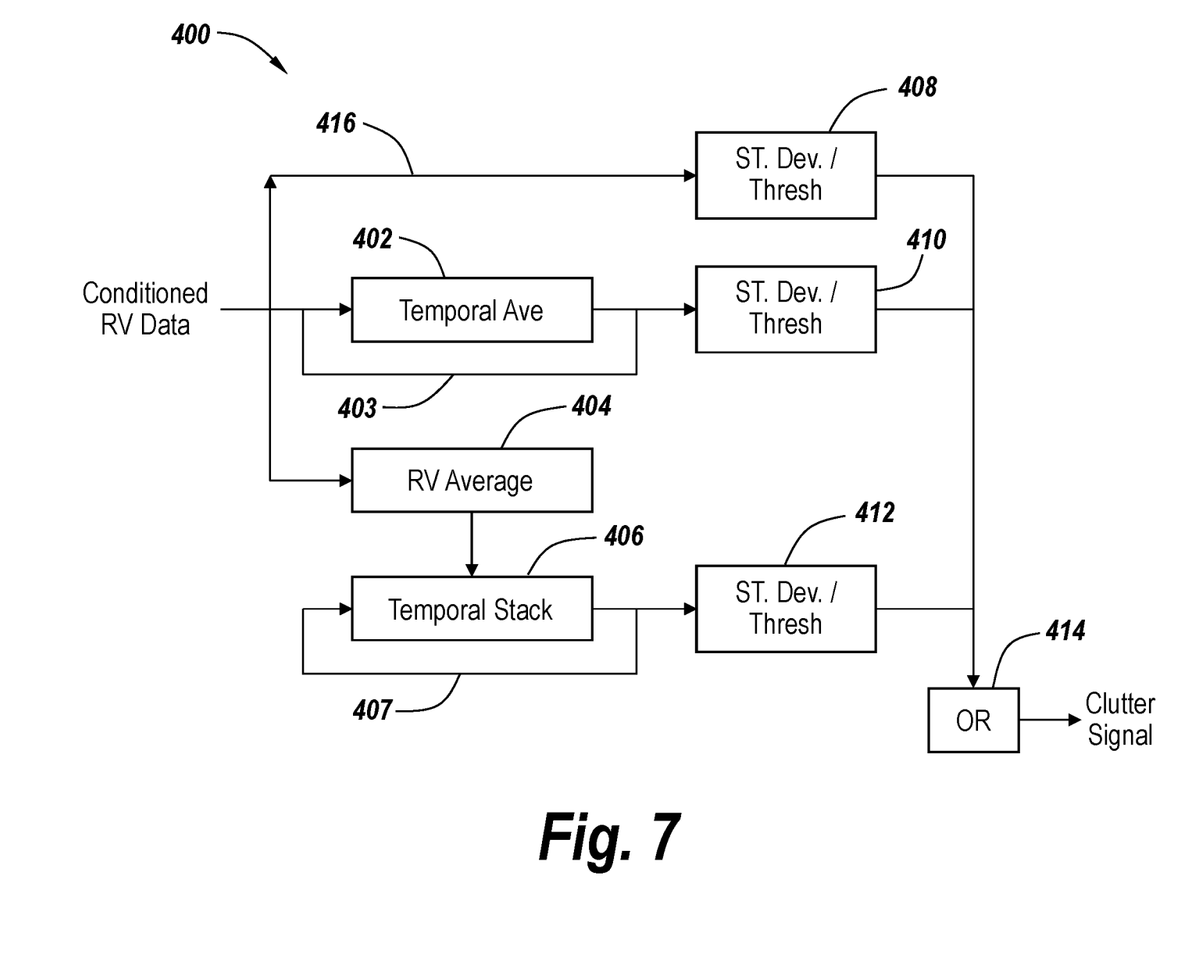
FIG. 7 includes a logical flow diagram of steps in clutter detection 400 illustrated in FIG. 5, according to some exemplary embodiments.

FIG. 7 includes a logical flow diagram of steps in clutter detection 400 illustrated in FIG. 5, according to some exemplary embodiments. Referring to FIG. 7, the conditioned RV data is received at the three independent analyses described herein, namely, the immediate detection analysis, indicated by line 416, the temporal averaging analysis 402, and the RV averaging analysis 404.

Continuing to refer to FIG. 7, as described above in connection with FIG. 2, for the immediate detection analysis, the sweep data at 416 is compared to the predetermined threshold, illustrated for two sweeps as 101c and 101d, in threshold comparison processing 408. In some embodiments, a standard deviation of the sweep data is computed in a moving time window as data for successive sweeps is received. The standard deviation is compared to a predetermined threshold standard deviation. If the threshold is exceeded, then a clutter detection signal is issued and transmitted to OR processing 414.

Continuing to refer to FIG. 7, as described above in connection with FIG. 3, the temporal averaging analysis 402 is sensitive to small clutter signals that are unchanging over time. The analysis maintains temporal averaged array of clutter signals at different RV bins. Each new radar sweep provides signals in an array at different RV bins, which is combined with the temporal averaged array. In some exemplary embodiments, each new array of signals is combined with the temporal averaged array to produce a fading-memory temporal average, and this average is preserved from one sweep to the next. The feedback path 403 indicates the preservation of the temporal average information from one radar sweep to the next radar sweep. The variation of these averages across RV bins is used to indicate the presence of a clutter object, for example, the object indicated by peaks 107a-107f in FIG. 3. In some exemplary embodiments, the variations in the average 102g, computed by a standard deviation of values across RV bins, can be compared to a predetermined clutter threshold in threshold comparison processing 410. If the threshold is exceeded, then a clutter detection signal is issued and transmitted to OR processing 414.

Continuing to refer to FIG. 7, as described above in connection with FIG. 4, the RV averaging analysis 404 and 406 is sensitive to radar returns that change strength over time, even in the absence of distinctly identifiable clutter objects. According to exemplary embodiments, the Doppler signals from a set of RV bins are averaged, and the averaged data 105a, referred to herein as the RV average, is observed over many sweeps to identify variations over time. Over time, these RV averages 105b are maintained in memory, referred to herein as temporal stack 406. Over time, returns for each new sweep are averaged over the set of RV bins, and the RV average is appended to the stack. In some exemplary embodiments, this stack is maintained in a first-in-first-out (FIFO) configuration such that, after the stack is full at a predetermined number of sweeps, e.g., 100 sweeps, as each new sweep is received, the RV average is appended to the stack, and the RV average from the oldest sweep is removed from the stack. The feedback path 407 indicates the preservation of the temporal stack information from one radar sweep to the next radar sweep. The stack of RV averages is analyzed for temporal variability. A standard deviation measuring variability can be computed across the temporal stack and can be compared to a predetermined threshold in threshold comparison processing 412. If the threshold is exceeded, then a clutter detection signal is issued and transmitted to OR processing 414.

Hence. OR processing 414 receives signals indicative of indications generated by immediate detection analysis, temporal averaging analysis and RV averaging analysis. If any of these indications is active/true, then OR processing generates an active/true clutter signal.

Figure 8:
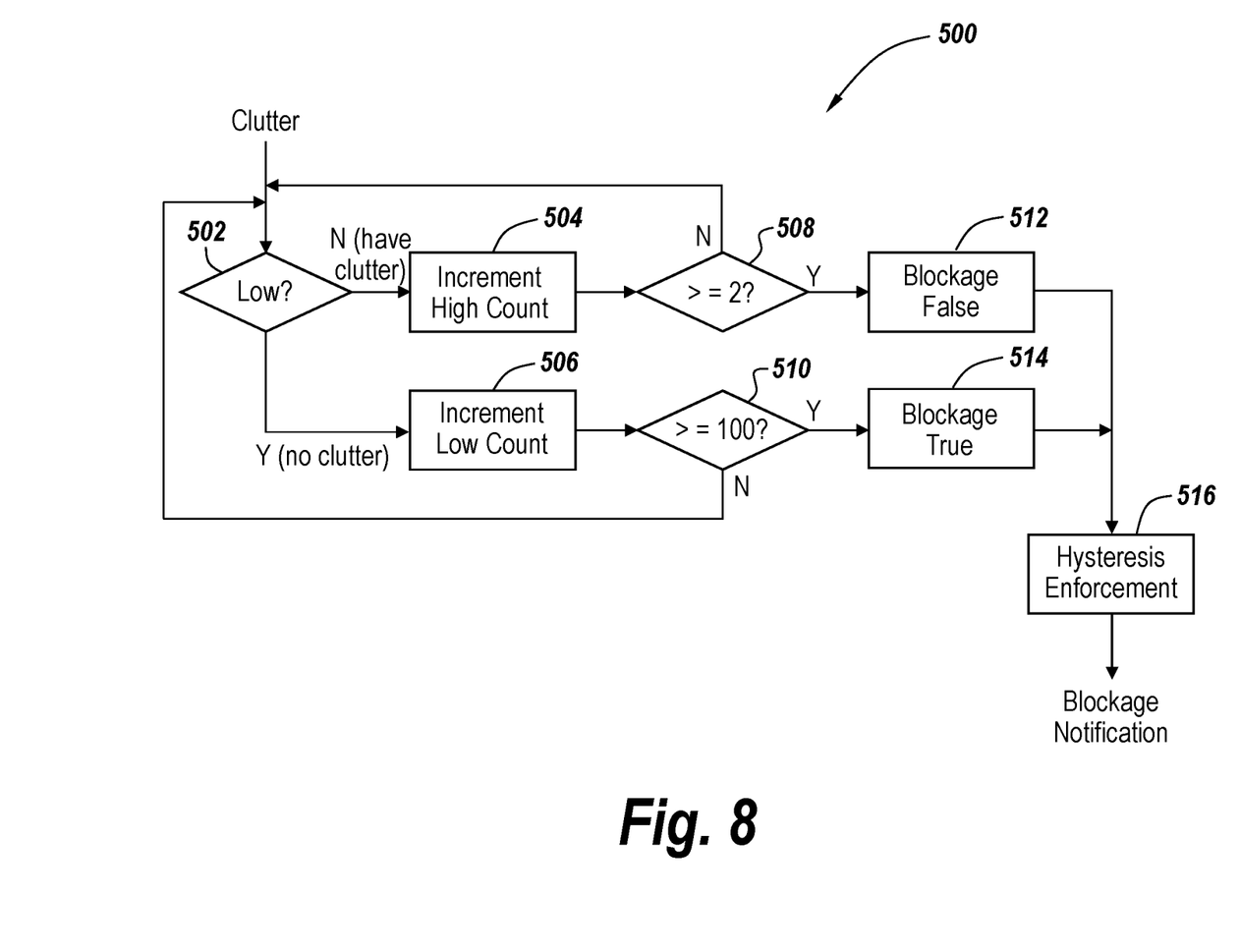
FIG. 8 includes a logical flow diagram of steps in blockage detection logic illustrated in FIG. 5, according to some exemplary embodiments.

In general, if any of the analyses described herein results in a detection clutter detection, then it can be concluded from the results of the OR processing 414 that the sensor is not blocked. However, according to the present disclosure, the blockage or non-blockage conclusion is determined based on reduction or elimination of errors in the conclusion, using blockage detection logic 500. FIG. 8 includes a logical flow diagram of steps in blockage detection logic 500 illustrated in FIG. 5, according to some exemplary embodiments. Referring to FIG. 8, the clutter signal is received at a decision block 502. If the clutter signal is low, i.e., inactive or false, then clutter is not detected, and a low count is incremented in step 506. To increase confidence in a blockage conclusion in the absence of clutter detections, a predetermined minimum number of cycles, i.e., sweeps, without a clutter detection is required before a notification of sensor blockage is issued. To that end, in decision block 510, a determination is made as to whether the minimum number of cycles without a clutter detection has been reached. In the particular exemplary embodiment illustrated in FIG. 8, the minimum number of cycles is 100. It will be understood that other minimums can be selected. If the minimum has not been reached, then flow returns to decision block 502, where the next sweep is analyzed. If the minimum has been reached, then a sensor blockage is indicated in step 514.

In decision block 502, if the clutter signal is high, i.e., active or true, then clutter is detected, and a high count is incremented in step 504. To increase confidence in a non-blockage conclusion in the presence of clutter detections, a predetermined minimum number of cycles, i.e., sweeps, with a clutter detection present is required before a notification of sensor non-blockage is issued. To that end, in decision block 508, a determination is made as to whether the minimum number of cycles with a clutter detection has been reached. In the particular exemplary embodiment illustrated in FIG. 8, the minimum number of cycles is two. It will be understood that other minimums can be selected. If the minimum has not been reached, then flow returns to decision block 502, where the next sweep is analyzed. If the minimum has been reached, then a sensor non-blockage is indicated in step 514.

In the exemplary embodiment illustrated in FIG. 8, a hysteresis characteristic of the blockage and non-blockage notifications is included. In general, under the hysteresis feature processing 516, a new notification state, i.e., blockage or non-blockage, must be maintained for a predetermined period of time before the notification state can be toggled again. In some exemplary embodiments, that predetermined period of time can be set at approximately 30 seconds. Other periods of time can be used. A timer in hysteresis feature processing 516 checks the timer to determine whether the predetermined hysteresis time period has expired. When blockage or non-blockage notifications are issued in blocks 514 and 512, respectively, if the hysteresis timing characteristic is met, then the appropriate final blockage or non-blockage notification is issued.

Figure 9:
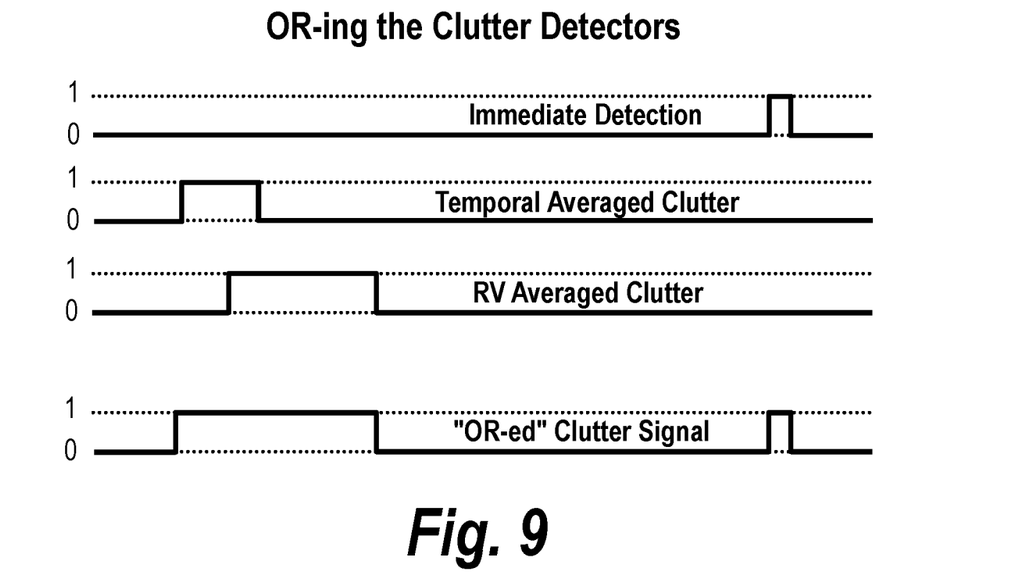
FIGS. 9 and 10 include timing diagrams illustrating timing of signals associated with the radar sensor blockage detection, according to some exemplary embodiments.
Figure 10:
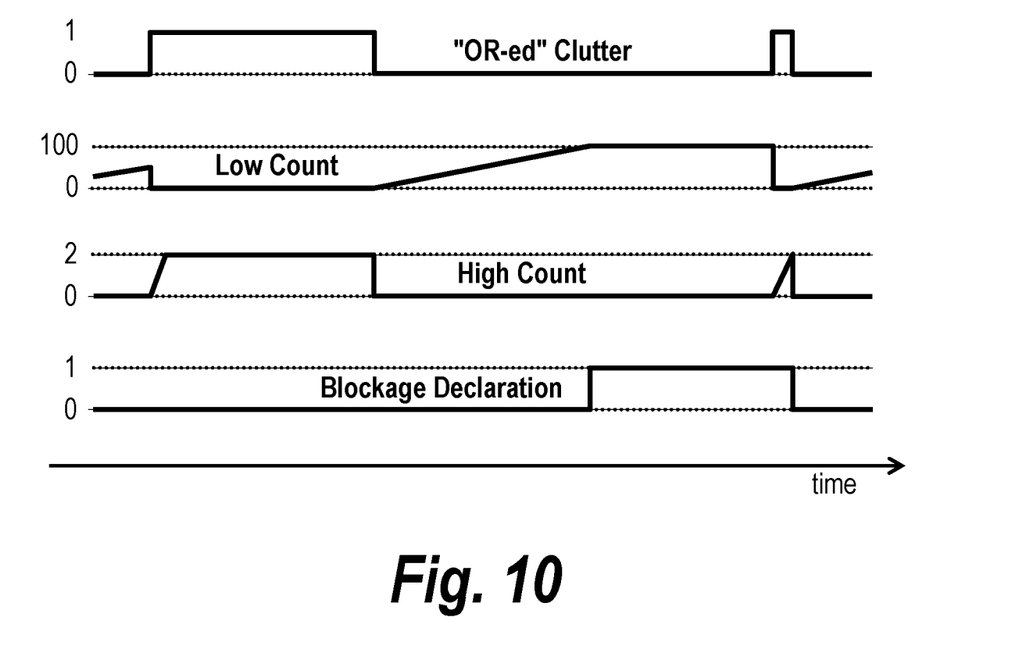

FIGS. 9 and 10 include timing diagrams illustrating timing of signals associated with the radar sensor blockage detection, according to some exemplary embodiments. Specifically, FIG. 9 illustrates exemplary timing waveforms for a clutter detection signal generated according to immediate detection threshold comparison processing 408, a clutter detection signal generated according to temporal averaging threshold comparison processing 410, a clutter detection signal generated according to RV averaging threshold comparison processing 412, and the resulting "OR'ed" clutter signal from OR processing 414. FIG. 10 illustrates exemplary timing waveforms for the "OR'ed" clutter signal from OR processing 414, the low count generated in step 506 of FIG. 8, the high count generated in step 504 of FIG. 8, and the blockage notification signal generated according to the present disclosure.

Hence, according to the exemplary embodiments, multiple averaging approaches to clutter detection are used to detect low-amplitude clutter objects that would otherwise be hidden below the detection threshold. With two or more approaches, the approach provides the flexibility to set thresholds independently for each approach to respond to different types of clutter. Since different averaging approaches are sensitive to different types of clutter, the independent thresholds can be raised to minimize false clutter detections in blocked situations.

Figure 11:
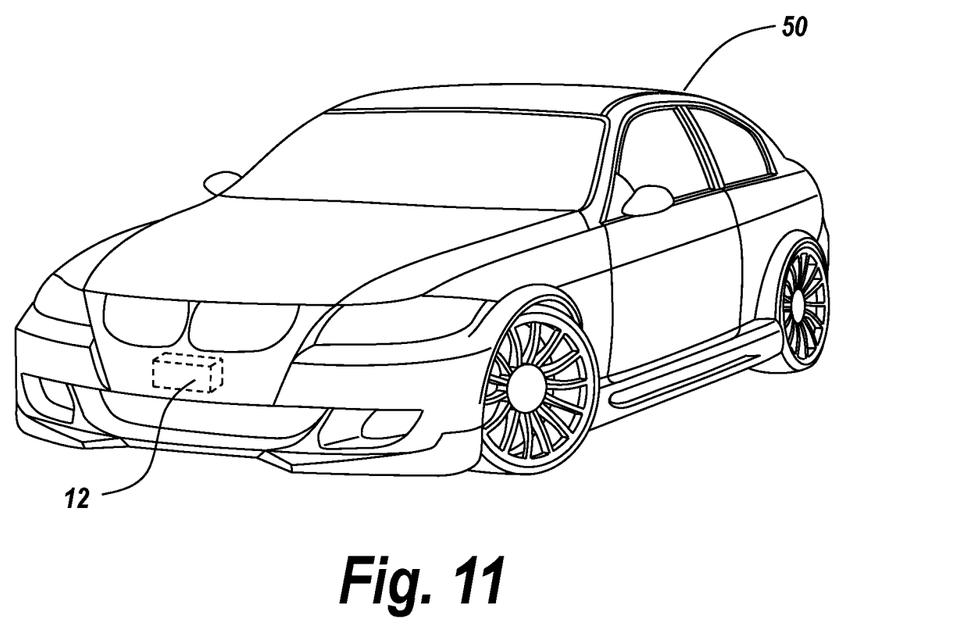
FIG. 11 includes a schematic perspective view of an automobile equipped with one or more radar systems, including one or more radar sensor modules, described herein in detail, according to some exemplary embodiments.

FIG. 11 includes a schematic perspective view of an automobile 50, equipped with one or more radar systems 10, including one or more radar sensor modules 12, described herein in detail, according to exemplary embodiments. Referring to FIG. 11, it should be noted that, although only a single radar sensor module 12 is illustrated, it will be understood that multiple radar sensor modules 12 according to the exemplary embodiments can be used in automobile 50. Also, for simplicity of illustration, radar sensor module 12 is illustrated as being mounted on or in the front section of automobile 50. It will also be understood that one or more radar sensor modules 12 can be mounted at various locations on automobile 50, including at the rear of automobile 50.

Figure 12:
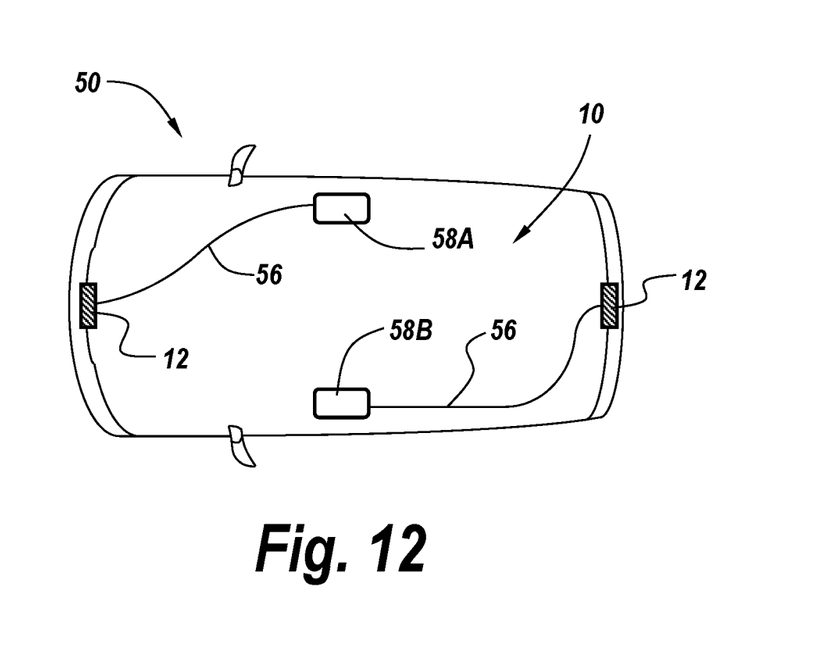
FIG. 12 includes a schematic top view of automobile equipped with two radar sensor modules, according to some exemplary embodiments.

FIG. 12 includes a schematic top view of automobile 50 equipped with two radar sensor modules 12, as described above in detail, according to exemplary embodiments. In the particular embodiments illustrated in FIG. 12, a first radar sensor module 12 is connected via a bus 56, which in some embodiments can be a standard automotive controller area network (CAN) bus, to a first CAN bus electronic control unit (ECU) 58A. Detections generated by the processing described herein in detail in radar sensor module 12 can be reported to ECU 58A, which processes the detections and can provide detection alerts via CAN bus 56. Similarly, in some exemplary embodiments, a second radar sensor module 12 is connected via CAN bus 56 to a second CAN bus electronic control unit (ECU) 58B. Detections generated by the radar processing described herein in detail in radar sensor module 12 can be reported to ECU 58B, which processes the detections and can provide detection alerts via CAN bus 56. It should be noted that this configuration is exemplary only, and that many other automobile radar system configurations within automobile 50 can be implemented. For example, a single ECU can be used instead of multiple ECUs. Also, the separate ECUs can be omitted altogether.

Whereas many alterations and modifications of the disclosure will become apparent to a person of ordinary skill in the art after having read the foregoing description, it is to be understood that the particular embodiments shown and described by way of illustration are in no way intended to be considered limiting. Further, the subject matter has been described with reference to particular embodiments, but variations within the spirit and scope of the disclosure will occur to those skilled in the art. It is noted that the foregoing examples have been provided merely for the purpose of explanation and are in no way to be construed as limiting of the present disclosure.

While the present inventive concept has been particularly shown and described with reference to exemplary embodiments thereof, it will be understood by those of ordinary skill in the art that various changes in form and details may be made therein without departing from the spirit and scope of the present inventive concept as defined by the following claims.

The invention claimed is:

1. A radar system in a movable host system, the radar system comprising:
   a radar detector for transmitting radar signals into a region over a plurality of sweeps, detecting reflected returning radar signals for each of the plurality of sweeps, and converting the reflected returning radar signals into digital data signals; and
   a processor for receiving the digital data signals and processing the digital data signals to detect environmental clutter objects in the region, the processing comprising at least: (i) an immediate detection process by which the digital data signals are compared to a clutter threshold and a first signal indicative of presence of a first clutter object is generated if the digital data signals exceed the clutter threshold, (ii) a time-averaging process by which data for each of a plurality of range-plus-velocity (RV) bins is analyzed over multiple sweeps to generate a second signal indicative of presence of a second clutter object, and (iii) an RV-averaging process independent of the time-averaging process by which data for a plurality of RV values within each sweep are combined to form RV averages for each sweep and the RV averages for a plurality of sweeps are analyzed over multiple sweeps to generate a third signal indicative of presence of a third clutter object; wherein
   the processor the processor applies the first, second and third signals to a logical OR process to generate a fourth signal indicating that the radar detector is not blocked if any of the first, second or third clutter objects is present.

2. The radar system of claim 1, wherein any pair of the first, second and third clutter objects are the same object.

3. The radar system of claim 1, wherein, if a strength of the reflected returning radar signals rises and falls with time, then a clutter object is detected.

4. The radar system of claim 1, wherein, if a strength of the reflected returning radar signals rises and falls with RV, then a clutter object is detected.

5. The radar system of claim 1, wherein, under the time averaging process, RV variations of a set of temporal averaged Doppler measurements from a number of sweeps are compared to an RV variation threshold, and, if the RV variation threshold is exceeded, then the second clutter object is detected.

6. The radar system of claim 1, wherein, under the RV averaging process, the variations of a set of RV averaged sweeps are compared to a temporal variation threshold and, if the temporal variation threshold is exceeded, then the third clutter object is detected.

7. The radar system of claim 1, wherein the first, second and third clutter objects are the same object.

8. A radar detection method in a movable host radar detection system, the radar detection method comprising:
   transmitting radar signals into a region over a plurality of sweeps;
   detecting reflected returning radar signals for each of the plurality of sweeps;
   converting the reflected returning radar signals into digital data signals; and
   processing the digital data signals to detect environmental clutter objects in the region, the processing comprising:
      performing an immediate detection process by which the digital data signals are compared to a clutter threshold and a first signal indicative of presence of a first clutter object is generated if the digital data signals exceed the clutter threshold,
      performing a time-averaging process by which data for each of a plurality of range-plus-velocity (RV) bins is analyzed over multiple sweeps to generate a second signal indicative of presence of a second clutter object,
      performing an RV-averaging process independent of the time-averaging process by which data for a plurality of RV values within each sweep are combined to form RV averages for each sweep and the RV averages for a plurality of sweeps are analyzed over multiple sweeps to generate a third signal indicative of a third clutter object,
      applying the first, second and third signals to a logical OR process to generate a fourth signal indicating that the radar detector is not blocked if any of the first, second or third clutter objects is present.

9. The method of claim 8, wherein any pair of the first, second and third clutter objects are the same object.

10. The method of claim 8, wherein, if a strength of the reflected returning radar signals rises and falls with time, then a clutter object is detected.

11. The method of claim 8, wherein, if a strength of the reflected returning radar signals rises and falls with RV, then a clutter object is detected.

12. The method of claim 8, wherein, under the time averaging process, RV variations of a set of temporal averaged Doppler measurements from a number of sweeps are compared to an RV variation threshold, and, if the RV variation threshold is exceeded, then the second clutter object is detected.

13. The method of claim 8, wherein, under the RV averaging process, the variations of a set of RV averaged sweeps are compared to a temporal variation threshold and, if the temporal variation threshold is exceeded, then the third clutter object is detected.

14. The method of claim 8, wherein the first, second and third clutter objects are the same object.

* * * * *